United States Patent

[11] 3,599,007

[72] Inventor William H. Martin, Jr.
Morristown, N.J.

[21] Appl. No. 888,540
[22] Filed Dec. 29, 1969
[45] Patented Aug. 10, 1971
[73] Assignee Bell Telephone Laboratories Incorporated
Murray Hill, Berkeley Heights, N.J.

[54] DIGITAL SYNCHRONIZER CHECK AND SYNCHROSCOPE
8 Claims, 15 Drawing Figs.

[52] U.S. Cl. .......... 307/87
[51] Int. Cl. .......... H02j 3/42
[50] Field of Search .......... 307/85—87

[56] References Cited

UNITED STATES PATENTS

| | | | |
|---|---|---|---|
| 2,817,024 | 12/1957 | Karlicek | 307/87 |
| 3,069,555 | 12/1962 | Kessler | 307/87 |
| 3,069,556 | 12/1962 | Apfelbeck et al. | 307/87 |
| 3,493,778 | 2/1970 | Cutler et al. | 307/87 |
| 3,497,711 | 2/1970 | Wuttig | 307/87 |

*Primary Examiner*—William M. Shoop, Jr.
*Attorneys*—R. J. Gut and E. W. Adams, Jr.

ABSTRACT: Logic circuits detect the polarities and zero crossings of the two AC sources to be paralleled. From this information, the relative frequency and relative phase angle are measured. Additional logic circuits allow paralleling signals to be passed during frequency and phase combinations that anticipate synchronism by the paralleling circuit closing time, provide the oncoming source has a slightly higher frequency than the bus, and provision is made for varying the anticipated closing time. The phase angle passband is automatically adjusted as the relative frequency changes to optimize the checking function, and provision is made to restrict manual paralleling to a narrower band. In addition, digital readouts driven by the relative phase measuring logic circuit provide a synchroscope at little added cost.

INVENTOR
W. H. MARTIN, JR.
BY John P. MacDonnell
ATTORNEY

FIG. 3
| CLOSING TIME (SEC.) | $\Phi_1$ | $\Phi_2$ | $\Phi_3$ | $\Phi_4$ | $\Phi_5$ | $\Phi_6$ | $\Phi_7$ |
|---|---|---|---|---|---|---|---|
| .05-.15 | 40° | 30° | 20° | 20° | 20° | 30° | 30° |
| .15-.25 | 40° | 30° | 20° | 20° | 20° | 30° | 30° |
| .25-.35 | 40° | 30° | 20° | 20° | 20° | 30° | 30° |
| .35-.45 | 50° | 40° | 30° | 20° | 20° | 30° | 30° |
| .45-.55 | 60° | 50° | 40° | 30° | 20° | 40° | 30° |
| .55-.65 | 70° | 60° | 50° | 40° | 20° | 50° | 30° |
| .65-.75 | 70° | 60° | 50° | 40° | 30° | 50° | 40° |
| .75-.85 | 80° | 70° | 60° | 50° | 30° | 60° | 40° |
FIG. 4
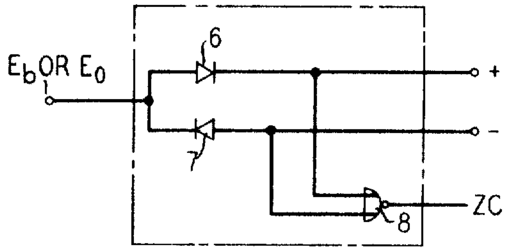
FIG. 5
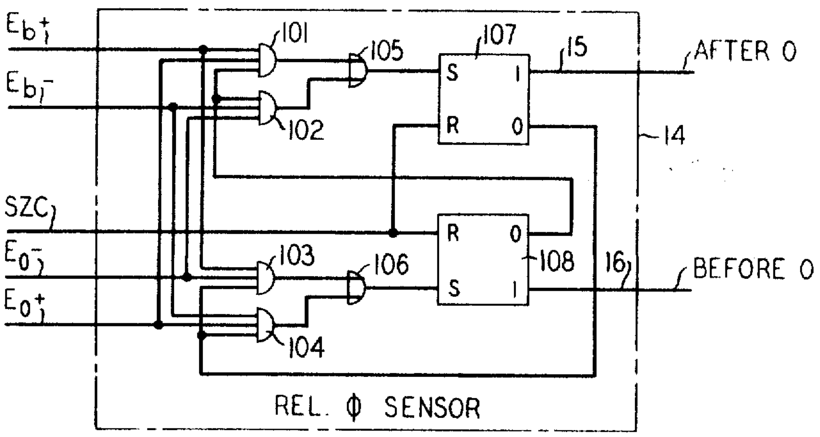

DIGITAL SYNCHRONIZER CHECK AND SYNCHROSCOPE

BACKGROUND OF THE INVENTION

This invention relates to equipment for paralleling two or more sources of alternating current. More particularly, it concerns synchronizer check equipment for preventing paralleling when conditions are improper and synchroscope equipment for indicating to an operator approaching proper paralleling conditions.

While it is necessary to insure only that the voltages are approximately equal and of like polarity in order to parallel safely two sources of direct current, alternating current sources require considerably more care. Both the frequency and the phase must be closely matched as well to avoid damaging circulating currents. Since circuit breakers may take as long a time as many cycles of input voltage to close, proper paralleling requires that a closing signal be given in advance of the time when optimum conditions will exist. The length of time by which the closing signal must anticipate the optimum conditions will vary with the operating time of the closing circuit. The prime mover of an alternator tends to slow down as the alternator begins to supply power to a load. Where one source is already supplying power to the load over a bus, therefore, optimum paralleling conditions require that an oncoming AC source have a slightly higher frequency just before paralleling. Upon completion of the paralleling operation, it will supply power as it locks on to the lower bus frequency. If the oncoming source frequency is not slightly higher than the bus frequency, it can upon paralleling create an objectionable reverse power condition by drawing power from the bus.

Synchronizer checks and synchroscopes have both existed for many years. They have been, however, separate devices of considerable cost and, in the case of the synchronizer check, yield a minimum of protection and information. Synchronizer checks of the prior art usually include transformer windings coupled to each source and interconnected to develop an analog voltage that is a function of the phase angle difference between the two sources. In general, they allow a paralleling connection to be made within a given phase angle and frequency difference without regard to the actual closing time of the paralleling breaker, whether the sources are approaching or leaving synchronism, or which source has the higher frequency. As a result, the wide phase angle passband that is required to guard an automatic synchronizer with a fairly long breaker circuit closing time will also allow paralleling under some very objectionable and damage-producing conditions. They do not prevent the reverse power situations or the poor practice of lazy or unskilled operators who give a paralleling signal far in advance of the proper time and allow the synchronizer check to complete the paralleling as soon as the phase angle enters the passband.

Synchroscopes of the prior art typically include a magnetically driven rotating pointer whose position indicates relative phase, whose direction of rotation indicates whether the oncoming source is fast or slow with respect to the bus, and whose speed of rotation indicates relative frequency between the two sources. Since a single rotation represents 360° phase angle difference, considerable operator experience and skill is required to effect an actual connection within the few degrees phase angle difference that is required for a smooth paralleling operation.

An object of this invention is to provide a digital synchronizer check.

Another object is to protect alternating current sources by allowing initiation of interconnection only when the oncoming source is of slightly higher frequency than the loaded source, the phase angle difference between the sources is within a passband that is a function of the frequency difference and the breaker closing time, and the two sources are approaching synchronism.

A third object is to provide more protection against paralleling AC sources under improper conditions than previously known synchronizer checks.

Another object is to vary continually the phase angle passband of a synchronizer check as the relative frequency varies.

Another object is to provide a narrower phase angle passband for manual paralleling than for automatic paralleling.

Still another object is to provide a digital synchroscope that utilizes the logic circuitry of the synchronizer check device.

SUMMARY OF THE INVENTION

A pair of zero crossing detectors, one connected to each source to be paralleled, indicates each zero crossing and the instantaneous polarity of the sources. Digital logic circuits using the zero crossing indications and polarity indications as inputs measure the relative phase and relative frequency of the two sources, and a synchronism anticipating logic circuit emits a "PASS" signal in response to combinations of frequency and phase measurements that anticipate by a predetermined breaker circuit closing time synchronism between the sources. Finally, an interlock circuit prevents paralleling except in the presence of a "PASS" signal. Logic circuits may be included that determine the sense of the relative frequency and phase to prevent paralleling except when the oncoming source is of higher frequency than the bus and to give visual indications of approaching synchronism and an acceptable frequency difference. In addition, manual paralleling may be confined by the use of selector switches to a more restricted range of frequency and phase difference.

As an ancillary feature of the present invention, the same zero crossing and phase measuring logic may be used to drive numerical readout devices, thereby creating a new digital synchroscope that can be added to the synchronizer check at relatively little additional cost.

BRIEF DESCRIPTION OF THE DRAWINGS

FIG. 3 is a table of connections to be made to adjust the embodiment of FIGS. 1 and 2 for different breaker circuit closing times;

FIG. 4 is a schematic diagram of a zero crossing detector that may be used in blocks 11 and 12 of the circuit of FIGS. 1 and 2;

FIG. 5 is a schematic diagram of a relative phase sensor that may be used in block 14 of the circuit of FIGS. 1 and 2;

DETAILED DESCRIPTION

Figure 1:
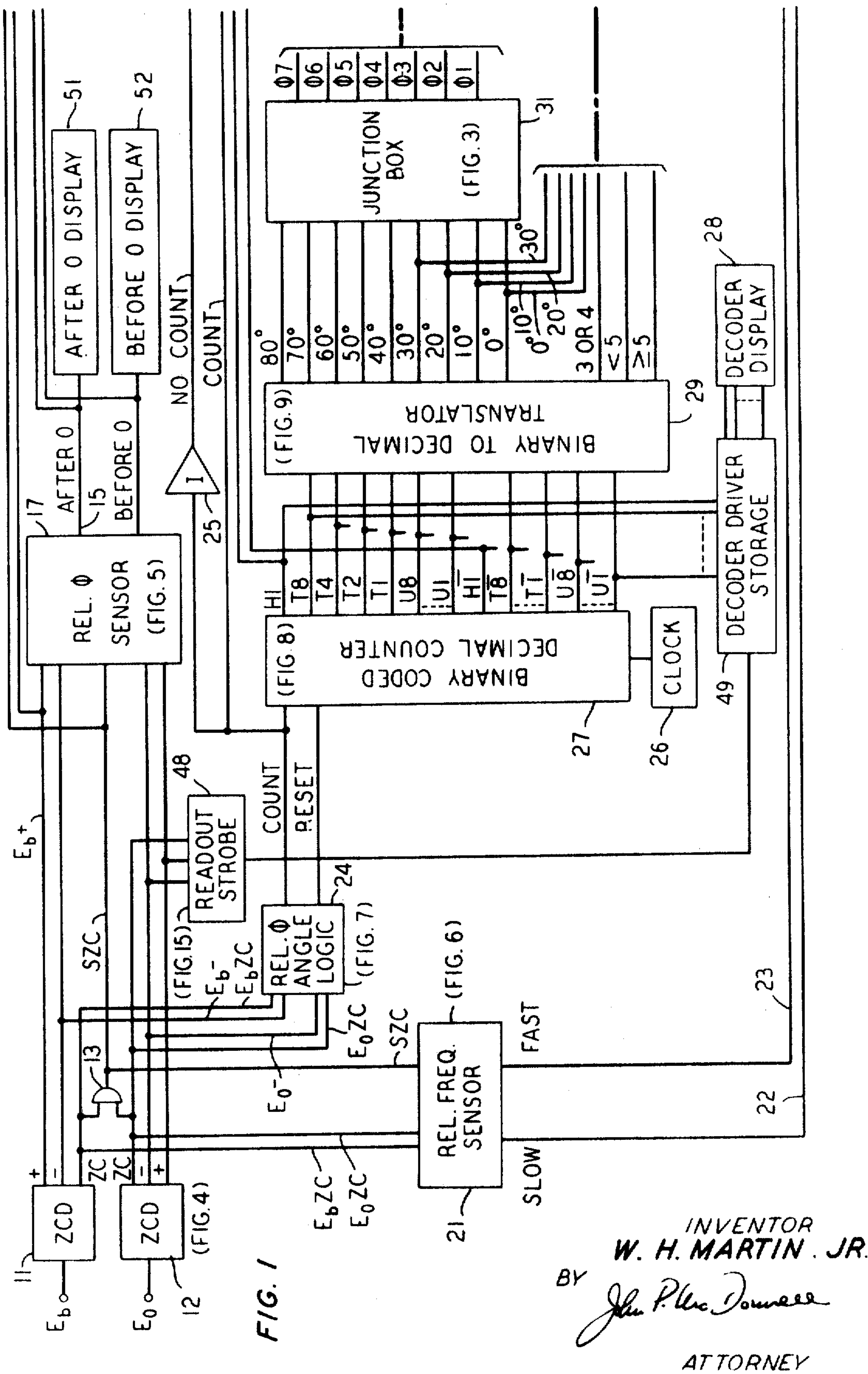
FIGS. 1 and 2 together, the top of FIG. 1 joined to the bottom of FIG. 2, constitute a partly block partly schematic diagram of a useful embodiment of the invention.
Figure 2:
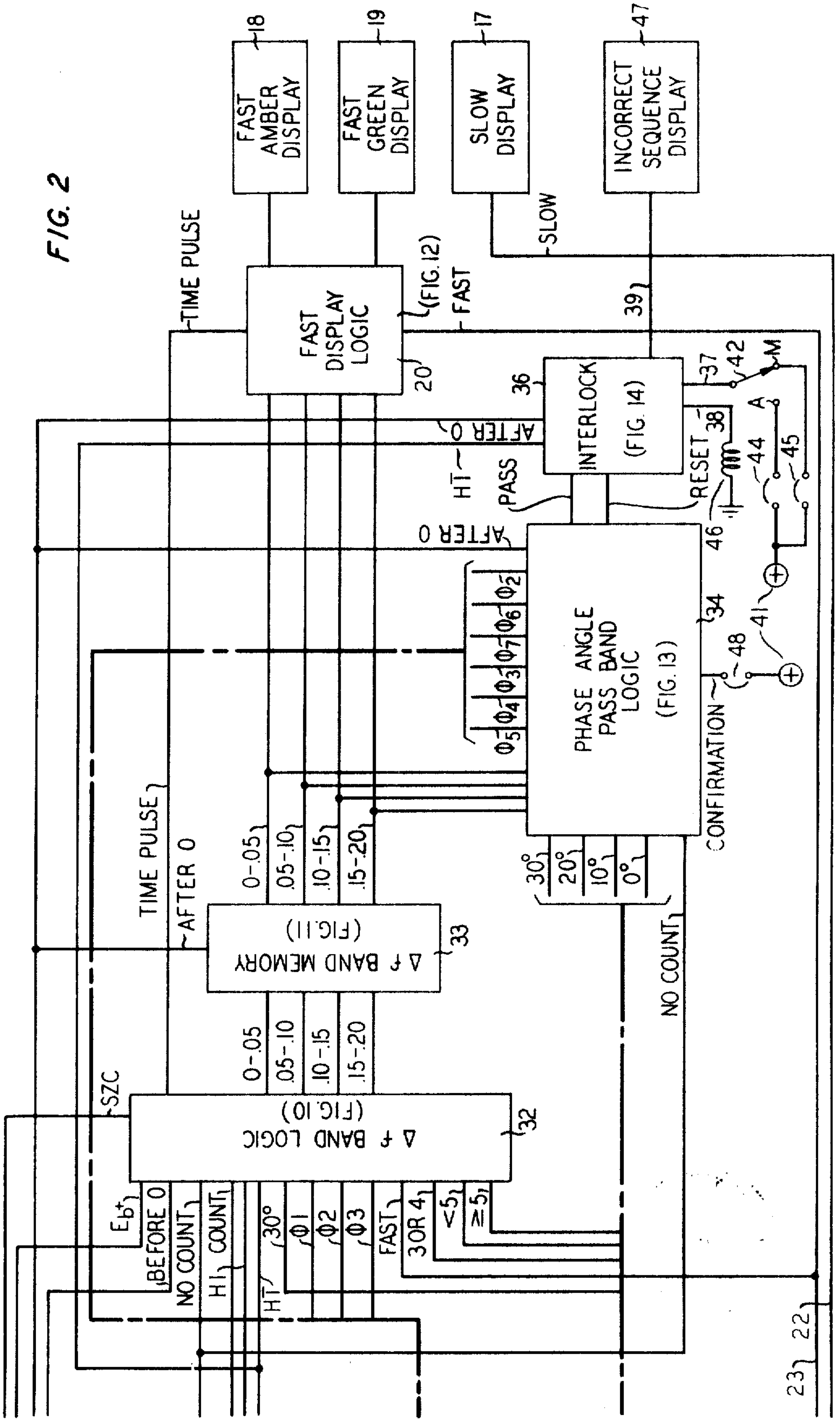

In the diagram of FIGS. 1 and 2, input and output leads to the blocks are labeled with symbols signifying the information that is transmitted over the leads. The diagram includes all the circuits required for both the synchronizer check and the synchroscope. The synchronizer check will be described first.

The basic information needed from each source to be paralleled is supplied by a pair of zero crossing detectors 11 and 12 connected to inputs $E_b$ and $E_o$, respectively. In operation, the lead $E_b$ (bus voltage) will be attached to the bus, and via the bus to the source that may be underload; $E_o$ (oncoming generator voltage) will be attached to the oncoming source. Single-ended connections are shown; a common ground is of course assumed. Each zero crossing detector provides an output voltage on a "+" or "−" output when its input is positive or negative, respectively, and a pulse on a "ZC" output in response to each zero crossing of its input voltage. The zero crossing detectors will be hereinafter described in connection with FIG. 4. An AND gate 13 has an input connected to each "ZC" output from the zero crossing detectors and provides a pulse on its output lead "SZC" in response to simultaneous "ZC" pulses from detectors 11 and 12, hence, in response to simultaneous zero crossings of the sources.

A relative phase sensing logic circuit 14, discussed hereinafter as FIG. 5, is connected to receive the "+" and "−" outputs from the zero crossing detectors and the "SZC" output from AND gate 13. In response to this information, logic circuit 14 provides an output voltage, that is, a "1" output, an output lead 15 when the AC source voltages are approaching synchronism (BEFORE 0) and on output lead 16 when the sources are leaving synchronism (AFTER 0).

Figure 6:
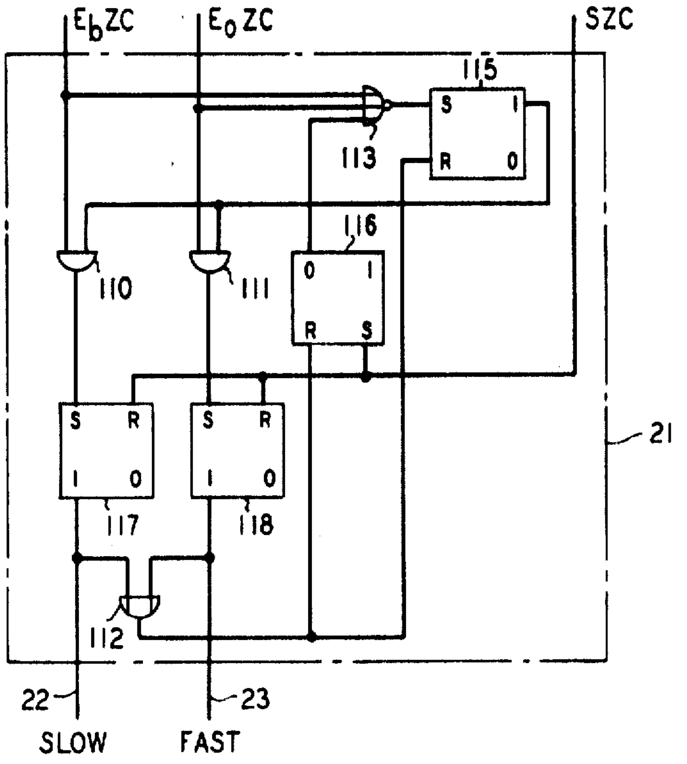
FIG. 6 is a schematic diagram of a relative frequency sensor that may be used in block 21 of the circuit of FIGS. 1 and 2.

A relative frequency sensing logic circuit 21, shown and discussed in detail as FIG. 6, is connected to receive the "ZC" pulses from both zero crossing detectors 11 and 12 and the "SZC" pulses from AND gate 13. It produces a "1" output on a first output lead 22 when the frequency of the signal on the input $E_o$ is lower than that on input $E_b$ (SLOW) and a "1" output on a second output lead 23 when the frequency of the signal $E_o$ is higher than that on $E_b$ (FAST). The outputs are used in later-described logic circuits.

Figure 7:
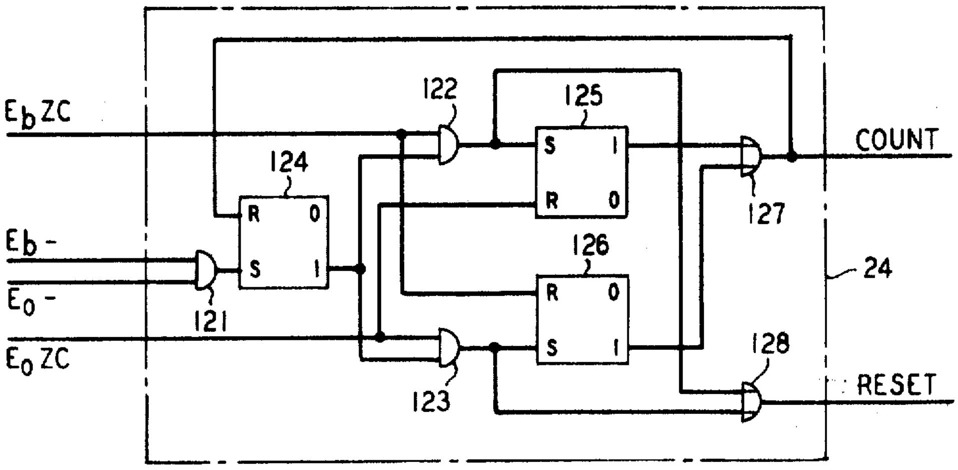
FIG. 7 is a schematic diagram of a relative phase angle logic circuit that may be used in block 24 of the circuit of FIGS. 1 and 2.

A relative phase angle determining circuit includes a logic circuit 24, a clock oscillator 26 and a counter 27. Logic circuit 24, later discussed as FIG. 7, is connected to receive the "−" and "ZC" outputs from zero crossing detectors 11 and 12 and has two output leads "COUNT" and "RESET." Logic circuit 24 places a "1" output on the "COUNT" output lead and a pulse on the "RESET" output lead in response to the first zero crossing in a positive-going direction of either source after both sources are negative, and replaces the "1" output on the "COUNT" lead with a "0" in response to the next positive-going zero crossing of the other source. Pulses from clock oscillator 26 are passed to counter 27 when the "1" exists on the "COUNT" output lead. At a given frequency, the phase angle is a direct function of time. If the clock oscillator frequency is properly chosen, therefore, the counter can count one pulse for each degree of phase angle difference between the two sources.

The counter shown in FIG. 1 may be of the binary coded decimal variety; there are four binary digit outputs for each of the decimal digits, units, and tens and one binary digit output for hundreds. The counter should also have the inverse binary digits available as outputs for the units and tens. The invention is of course not restricted to this particular type counter; the counting function may be performed by any of several other well-known methods. The counter outputs indicate in coded form the relative phase angle difference between the input source voltages. This information is used to determine both the frequency difference between the sources and whether the combination of phase and frequency is currently proper to effect a smooth paralleling after the elapse of breaker circuit closing time.

Figure 9:
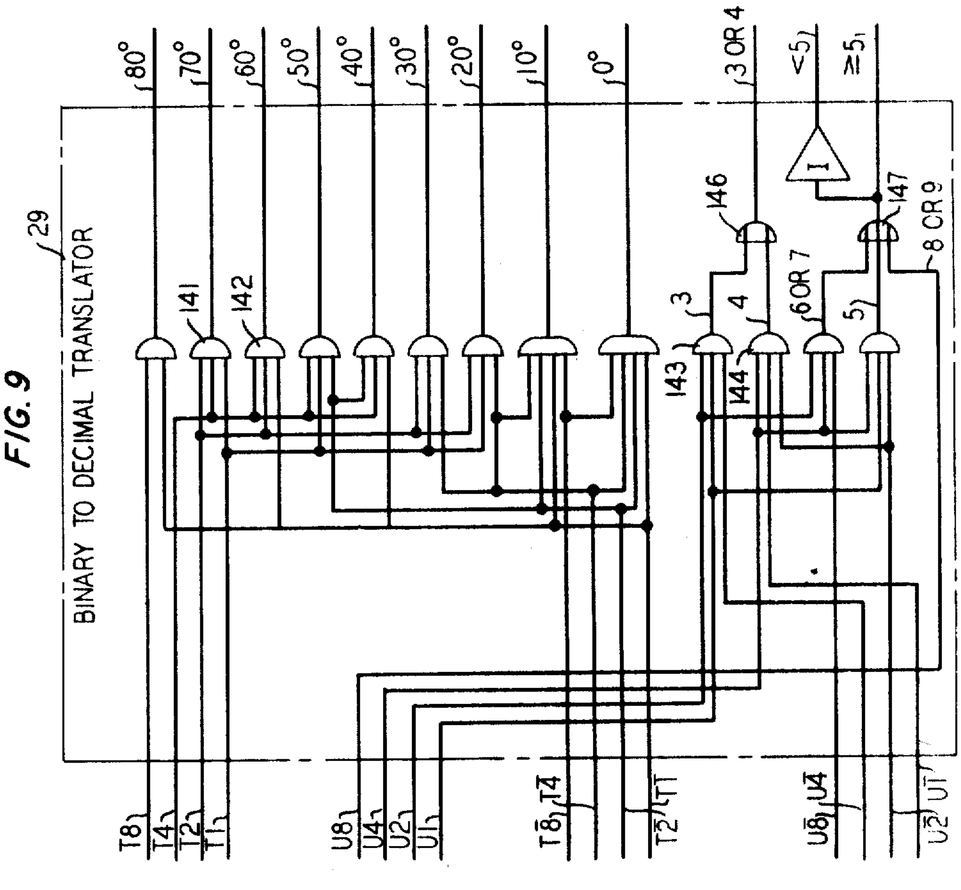
FIG. 9 is a schematic diagram of a binary to decimal translator that may be used in block 29 of the circuit of FIGS. 1 and 2.

A translator 29, discussed hereinafter as FIG. 9, converts the binary coded information from counter 27 into decade degrees in the form of the presence of voltage ("1st") or the absence of voltage ("Os") on its outputs 0°—80°. Translator 29 has three additional outputs for interpolation between the decades: "≥5", <5," and "3 or 4." Of course, in place of the three interpolating outputs, a whole units decade consisting of outputs 0 to 9 could be used. Since three outputs are fully adequate for paralleling common power frequencies, however, the added expense is not warranted. It should also be obvious to the reader that if a decimal counter were used for counter 27 there would be no need for translator 29.

The decade degree outputs are connected within a junction box 31 to seven gate leads, 1 through 7. The particular interconnections depend upon the closing time of the paralleling circuit that is to be guarded by the synchronizer check. For a permanent installation, therefore, where the synchronizer check is permanently guarding a single circuit, junction box 31 may be eliminated, and the connections may be permanently wired. On the other hand, the connections in junction box 31 may be made by the use of printed circuit cards, a different card for each circuit closing time range, or by individual switches. The table of FIG. 3 indicates the particular connections to be made between the decade degree outputs from translator 29 and the gate outputs of junction box 31 for various closing times. The closing time to be considered is the total time between the closing of the switch that initiates a closing until the final circuit breaker is closed, paralleling the two sources.

A $\Delta f$ band logic circuit 32, later described in detail as FIG. 10, measures the frequency difference between the sources once per slip cycle—that is, once during the time between successive simultaneous in-phase zero crossings. If the difference is within four bands between 0 and 0.2 Hz., it provides a "1" on its corresponding output lead-in time to allow a paralleling connection. The measurement is made when other conditions are proper for paralleling. That is, when the frequency of $E_o$ is higher than that of $E_b$ and the sources are approaching synchronism. The circuit also applies a pulse at the end of a timed interval to a fifth output "TIME PULSE." To perform this logic the circuit utilizes the information from the following input leads:

"+" from zero crossing detector 11; "SZC" from AND gate 13; "BEFORE 0" from relative phase sensor 14; "COUNT" from relative phase angle detector 24; "NO COUNT" from inverter 25; "H1" and "HT" from counter 27; 30°, "3 or 4," "<5," "≥5" from translator 29; gates 1, 2, and 3 from junction box 31; and "FAST" output 23 from relative frequency sensor 21. The four $\Delta f$ band outputs from the $\Delta f$ band logic circuit 32 are fed to a $\Delta f$ band memory circuit 33, which provides a continuous "1" output for each activated band until its reset by the "AFTER 0" voltage from relative phase sensor 14.

Whether or not an adjustment is required in the frequency of $E_o$ is indicated to the operator by three visual displays 17, 18 and 19, respectively. Such displays may be simply illuminated signs. The "SLOW" output from relative frequency determining circuit 21 drives "SLOW" display 17. A "FAST" display logic circuit 20 combines the relative frequency information from logic circuits 21 and 32 and from memory 33 to drive "FAST" displays 18 and 19. In the absence of a signal voltage on all of the $\Delta f$ band memory outputs immediately after a time pulse, an output voltage is supplied to drive "FAST AMBER" display 18. The combination of a signal voltage on "FAST" output 23 of logic circuit 21 and a signal voltage on any of the outputs of $\Delta f$ band memory 33 supplies an output voltage to drive "FAST GREEN" display 19.

The relative phase angle through which a source paralleling connection will be allowed for each frequency difference band is determined by phase angle passband logic circuit 34, which is later discussed as FIG. 13. This logic circuit acts upon all the logic information from the $\Delta f$ band memory 33, the 0° through 30° outputs from translator 29, the $\varphi 2$ through $\varphi 7$ gates from junction box 31, the "NO COUNT" output from inverter 35 and the "AFTER 0" output from relative phase sensor 14. Circuit 34 has only two outputs, a "PASS" output on which a "1" is impressed during the time when a paralleling signal can safely be given, and a "RESET" output. Whenever the conditions are not within the passband the "PASS" output voltage "1" is replaced with a "0," and a "1" is applied to the "RESET" output.

As a final link in the synchronizer checking process, an interlock circuit 36 operates to allow a separately applied closing signal to effect an actual closure only when an output voltage is present on the "PASS" output from phase angle passband logic circuit 34. This circuit is described as FIG. 14. In addition to a "PASS" and a "RESET" input from logic circuit 34, an "HT" input from counter 27 and an "AFTER 0" input from relative phase sensor 14, interlock circuit 36 has another input 37 and two outputs 38 and 39, respectively. Input 37 is connected to a breaker power source 41 through a manual-automatic selector switch 42 and either a manually operated set of contacts 43 or an automatic synchronizer set of contacts 44. When power source 41 is electrically connected to interlock input lead 37 in an attempt at paralleling the two AC sources, $E_b$ and $E_o$, one of the two outputs is energized. If the signal voltage ("1") exists one the "PASS" input, output 38 is energized to cause current to flow through circuit breaker closing coil 46, and the two sources are paralleled. If there is no signal voltage on the "PASS" input ("0") output 39 is energized to in turn energize an "INCORRECT SEQUENCE" display or alarm 47. Finally, a set of contacts 48, connected between source 41 and phase angle passband logic circuit 34, signals that the paralleling closure has been completed to allow the logic circuit to reset interlock 36.

In summary, then, in the synchronizer check circuit of FIGS. 1 and 2 zero crossing detectors 11 and 12 detect the instantaneous polarity and zero crossings of each of the sources to be paralleled. From this information, logic circuits 14 and 21 sense the relative phase and relative frequency respectively of the two sources. If the sources are leaving synchronism, logic circuit 34 cooperates with interlock circuit 36 to prevent a paralleling connection. Logic circuit 24, clock 26, counter 27, and translator 29 cooperate with the information from zero crossing detectors 11 and 12 to measure the phase angle in degrees between the two sources once each cycle of input voltage. If the sources are approaching synchronism and the oncoming source has a higher frequency than the bus, $\Delta f$ band logic circuit 32 acts on the phase angle information as altered by circuit closing time information fed into junction box 31 to define an acceptable range of frequency difference divided into four bands. Phase angle pass band logic circuit 34 utilizes the information from $\Delta f$ band logic circuit 32 as held by memory circuit 33 to provide a band of acceptable phase angle difference for each frequency difference band. If a paralleling signal is initiated by contacts 43 or 44 while the phase angle difference is acceptable for the measured frequency difference within any $\Delta f$ band, interlock circuit 36 allows breaker coil 46 to be energized, effecting a paralleling connection. Paralleling at all other times is prevented by interlock circuit 36; an untimely attempt precludes paralleling during the remainder of the slip cycle and causes display 47 to be energized.

Since relative phase sensing and measuring logic is employed in the synchronizer check, it is a very simple matter to provide the function of a synchroscope. Indeed this is one very valuable feature of the invention. The "FAST" and "SLOW" displays having been provided to indicate whether the oncoming source voltage is of a higher or lower frequency than the bus voltage, all that is really needed is a visual readout of the relative phase angle. In the circuit of FIG. 1, decoder display 28 provides this function. A number of such displays are readily available from several sources; they take the entire output of a counter such as binary coded decimal counter 27, decode it into decimal form, and drive numerical readouts such as neon indicator tubes.

In the circuit of FIGS. 1 and 2 a small additional amount of logic circuitry has been added to make the synchroscope digital readout more esthetically pleasing. A readout strobe circuit 48, which receives the information from the three outputs of zero crossing detector 12, passes a strobe signal to a decoder driver storage unit 49 that is inserted between counter 27 and decoder display 28. Storage circuit 49 stores the output of counter 27 to give a continuous output display until it rereads counter 27 in response to the strobe signal from readout strobe 48. This signal is given during a period when counter 27 is holding its count. Readout strobe 48 is shown and discussed as FIG. 15. Without this addition, display 28 resets to zero once each cycle of input voltage and follows each step of counter 27, briefly showing each number from zero to the final phase angle difference. This produces an annoying flicker. With strobe 48 and storage 49, however, the phase angle readout changes only as the phase angle itself changes. The flicker is eliminated, and if the frequencies of the two sources are identical, the readout remains steady. Decoder driver storage units are also readily available from several sources.

The synchroscope may of course be built without the synchronizer check. In that case, zero crossing detectors 11 and 12, simultaneous zero crossing detector 13, relative frequency sensor 21 with a "FAST" and "SLOW" display, relative phase angle logic 24, clock 26, counter 27 and decoder display 28 would be included. The result is still an inexpensive and effective synchroscope. The digital readouts are much easier to interpret than the standard rotating pointer. In addition, the psychological effect of a digital readout that changes every degree of phase angle difference as opposed to a pointer rotating one degree causes an operator to adjust the frequency of the oncoming source much closer to that of the bus before attempting to parallel the sources.

FIG. 1 also includes a pair of visual displays "BEFORE 0" and "AFTER 0" that may be driven by relative phase sensor 14, outputs 15 and 16, respectively. The added information can be of help to an operator.

The remaining FIGS. 4 through 15 illustrate logic circuits that may be used in the blocks of the circuit of FIGS. 1 and 2, to implement the invention.

A simple zero crossing detector such as that shown in FIG. 4 may be utilized for detectors 11 and 12. A pair of diodes 6 and 7 connected to input lead $E_b$ or $E_o$ in opposite polarity pass only the positive or negative half, respectively, of the source voltage signal to provide the "+" and "−" output signals. Each diode output is connected to an individual input of a NOR gate 8. When a source $E_b$ or $E_o$ is connected to the input, NOR gate 8 has an output "ZC" in the absence of both polarity inputs, hence, when the source is crossing zero.

A more sophisticated zero crossing detector which supplies the same output signals but operates over a more varying set of conditions is described in my copending application, Ser. No. 885,807, filed Dec. 17, 1969 and assigned to the same assignee as this application.

An effective circuit for relative phase sensor 14, shown in FIG. 5, comprises four 3-input AND gates 101 through 104, two 2-input OR gates, 105 and 106, and two flip-flops 107 and 108, respectively. The "$E_b$+" output from zero crossing detector 11 is connected to one input of each of AND gates 101 and 103, and the "$E_b$−" output is connected to one input of each of AND gates 102 and 104. The "$E_o$+" output from zero crossing detector 12 is connected to one input of each of AND gates 101 and 104, and the "$E_o$−" output is connected to one input of each of AND gates 102 and 103. The third input to AND gates 101 and 102 is connected to the "0" output of flip-flop 108, and the third input of AND gates 103 and 104 is connected to the "0" output of flip-flop 107. The "SZC" output of AND gate 13 is connected to the "reset" input of each flip-flop 107 and 108. The "1" output of flip-flop 107 is connected to output lead 15 "AFTER 0" and the "1" output of flip-flop 108 is connected to lead 16 "BEFORE 0."

The circuit of FIG. 5 operates on the principle that simultaneous zero crossings are either completely in phase or completely out of phase, and that immediately after an out-of-phase simultaneous zero crossing, the sources are approaching synchronism. A "SZC" pulse signifying a simultaneous zero crossing resets both flip-flops 107 and 108 to activate one input of each of the four AND gates 101, 102, 103 and 104. The source voltage polarity indications from zero crossing detectors 11 and 12 enable the proper AND gates to provide the in-phase or out-of-phase information. If both $E_b$ and $E_o$ are positive, for example, AND gate 101 is enabled, enabling OR gate 105 to set flip-flop 107. This causes an "AFTER 0" indication from output "1" of flip-flop 107, and AND gates 103 and 104 are disabled. A similar sequence occurs if both $E_b$ and $E_o$ are negative, AND gate 102 being enabled. If the sources are of opposite polarity, on the other hand, AND gate 103 or 104 is enabled, and flip-flop 108 is set to indicate "BEFORE 0."

Relative frequency sensor 21 may be implemented by a logic circuit such as that shown in FIG. 6. The circuit includes two 2-input AND gates 110 and 111, one 2-input OR gate 112, one 3-input NOR gate 113, and four flip-flops 115 through 118, respectively. Zero crossing pulses from detectors 11 and 12 are fed into separate inputs of AND gates 110 and 111 and NOR gate 113, respectively. The output of NOR gate 113 is connected to the "set" input of flip-flop 115. The "1" output of flip-flop 115 is connected to the other input of AND gates 110 and 111. The outputs of AND gates 110 and 111 are connected to the "set" inputs of flip-flops 117 and 118, respectively. The "1" output of flip-flop 117 is connected to the circuit "SLOW" output 22 and to one input of OR gate 112. The "1" output of flip-flop 118 is connected to the circuit "FAST" output and to the other input of OR gate 112. The output of OR gate 112 is connected to the "reset" inputs of flip-flops 116 and 115. Simultaneous zero crossing pulses from AND gate 13 (FIG. 1) are connected to the "set" input of flip-flop 116 and the "reset" inputs of flip-flops 117 and 118. Finally, the "0" output of flip-flop 116 is connected to the third input of NOR gate 113.

The circuit of FIG. 6 operates as follows: a simultaneous zero crossing pulse resets flip-flops 117 and 118 to remove any output from "SLOW" output 22 or "FAST" output 23. At the same time it sets flip-flop 116 to remove one input from NOR gate 113. When both sources have completed their zero crossings, as indicated by the absence of pulses on "$E_o$ZC" and "$E_b$ZC" leads, NOR gate 113 is enabled to set flip-flop 115. This in turn provides one input to each of AND gates 110 and 111. If the oncoming source is of a higher frequency than the loaded source, the first zero crossing pulse after simultaneous zero crossing will appear on the "$E_o$ZC" lead before one appears on the "$E_b$ZC" lead. The first pulse will enable AND gate 111 to set flip-flop 118 and provide an output on "FAST" output 23. Setting flip-flop 118 at the same time will enable OR gate 112 to reset flip-flops 115 and 116. This will remove one input from each of AND gates 110 and 111 and add an input to NOR gate 113. Thus the circuit is rendered nonresponsive to further zero crossings until the following simultaneous zero crossing pulse, which will reset flip-flops 117 and 118 and set flip-flop 116. If the oncoming source frequency had been lower than the loaded source frequency, a pulse would have appeared on "$E_b$ZC" first after the simultaneous zero crossing. That would enable AND gate 110 to set flip-flop 117 and provide a "SLOW" output indication. OR gate 112 would then again be enabled to reset flip-flops 115 and 116. The output, either "SLOW" or "FAST" from relative frequency sensor 21 is therefore held for the remainder of the one-half slip cycle until the next simultaneous zero crossing pulse.

Relative phase angle logic circuit 24 may be implemented by the circuit shown in FIG. 7. This circuit includes three AND gates 121, 122 and 123, three flip-flops 124, 125 and 126, and OR gates 127 and 128. The "$E_b$−" and "$E_o$−" leads from zero crossing detectors 11 and 12 are each connected to a separate input of AND gate 121. The output of AND gate 121 is connected to the "set" input of flip-flop 124. The "1" output of flip-flop 124 is connected to an input of each AND gate 122 and 123. Zero crossing pulses from zero crossing detector 11, "$E_b$ZC," are fed into the other input of AND gate 122 and the "reset" input of flip-flop 126. Pulses from zero crossing detector 12, "$E_o$ZC" are fed into the other input of AND gate 123 and the "reset" input of flip-flop 125. The output of AND gate 122 is connected to the "set" input of flip-flop 125 and to one input of OR gate 128. The output of AND gate 123 is connected to the "set" input of flip-flop 126 and the other input of OR gate 128. The output of OR gate 128 is connected to the "RESET" output of this logic circuit 24. The "1" outputs of flip-flops 125 and 126 are connected to the separate inputs of OR gate 127. Finally, the output of OR gate 127 is connected to the "COUNT" output of the circuit 24 and also the "reset" input of flip-flop 124.

The circuit of FIG. 7 operates as follows: Assume that all flip-flops are reset. When both sources are negative, AND gate 121 is enabled to set flip-flop 124 and provide one input to AND gates 122 and 123. This prepares the circuit to start counting at the next positive-going zero crossing. If the oncoming source crosses ahead of the bus, the next zero crossing will appear on "$E_o$ZC" and will enable AND gate 123. This will set flip-flop 126 and enable OR gate 127 to provide a "1" output on the "COUNT" output of the circuit. At the same time, the zero crossing pulse on "$E_o$ZC" will reset flip-flop 125; the output of AND gate 123 will enable OR gate 128 to provide a "RESET" pulse output from the circuit; and the "-COUNT" output will reset flip-flop 124 to prevent another count start until both sources are again negative by removing one input from each of AND gates 122 and 123. The next zero crossing pulse appears on "$E_b$ZC" and operates to reset flip-flop 126, thereby removing the input from OR gate 127 and removing the "COUNT" output of the circuit. The circuit therefore produces a "COUNT" output during the interval between the $E_o$ zero crossing and the $E_b$ zero crossing. If $E_b$ had crossed zero first, AND gate 122 would have been enabled to set flip-flop 125 and start the count at that point. The succeeding pulse of "$E_o$ZC" would reset flip-flop 125 to end the counting period. Counting is therefore started when either source crosses zero in a positive-going direction and is stopped when the other source crosses zero in a positive-going direction. The count is made once per cycle of either bus or oncoming source voltage.

Figure 8:
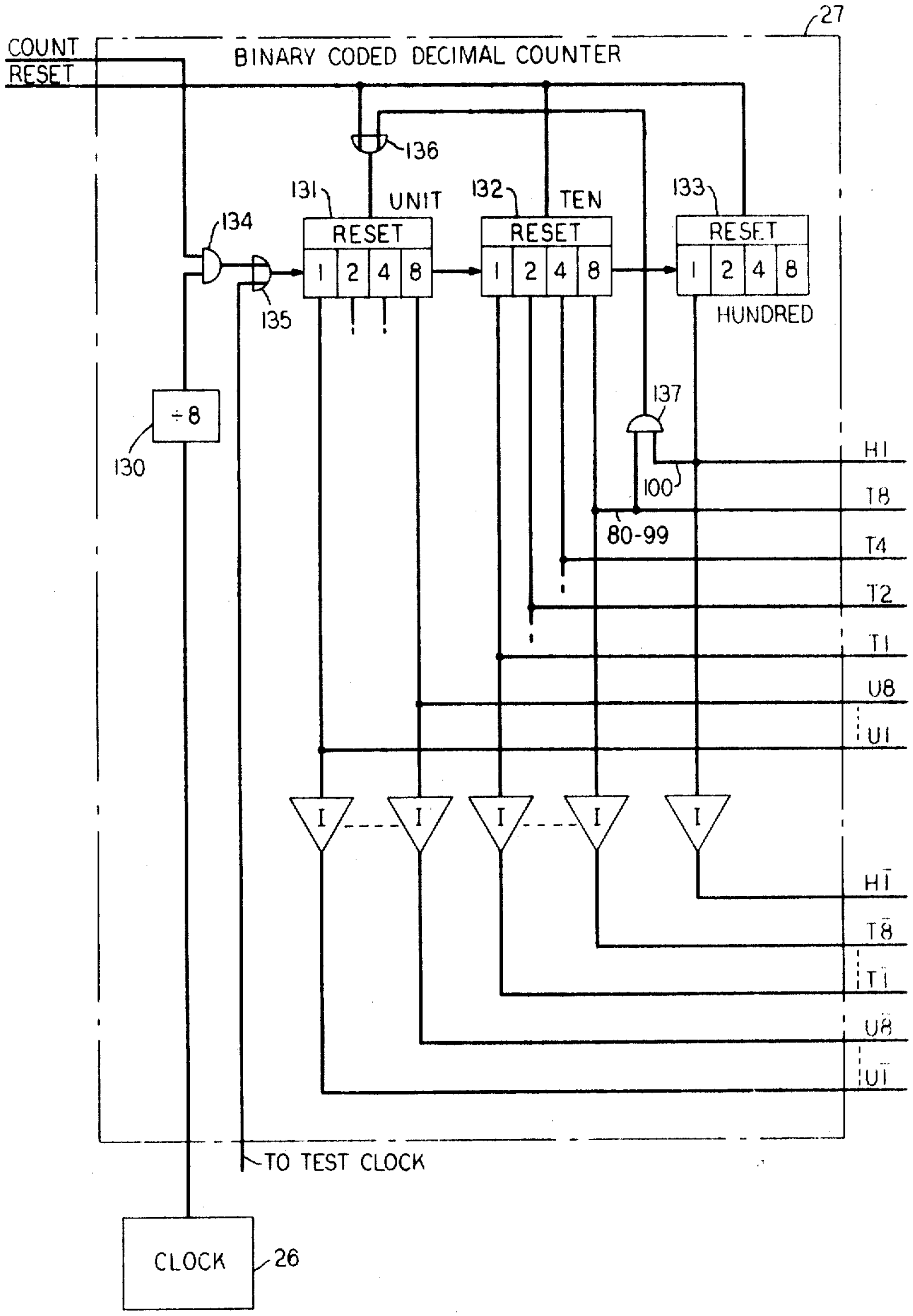
FIG. 8 is a schematic diagram of a binary coded decimal counter that may be used in block 27 of the circuit of FIGS. 1 and 2.

Counter 27 is shown in detail in FIG. 8. As was previously mentioned, counter 27 may be implemented by any of several well-known and available pulse counters. Some practical aspects of using a binary coded decimal counter are shown by the diagram of FIG. 8. The purpose of the counter is to count 1 pulse for each degree difference in the phases of the two sources, $E_o$ and $E_b$. Pulses must be fed into the counter, therefore, at the rate of 180 pulses for each one-half cycle of input voltage. With sources of 60 Hz. nominal, a range of 60 to 63 Hz. must be accommodated. With a 63 Hz. source the pulses must be generated at 63×360 or 22.68 kHz. Clock 26 could be designed to oscillate directly at this frequency. A more compact and reliable design can be obtained, however, with a frequency in the 100 to 200 kHz. range. Therefore, clock 26 is shown as an oscillator at 8 times the desired counting frequency (181.44 kHz.) followed by a divide by 8 circuit 130. The counter itself is a standard binary coded 3 decimal digit counter having a unit section 131, a tens sections 132 and a hundreds section 133. Since 180° is the highest number to be counted, the hundreds section need have only one binary digit rather than the four typical of the units and tens sections. Each counting section has an output for each binary digit. For example, the tens section has "T1," "T2," "T4" and "T8" outputs. Similarly, the units section has "U1" through "U8," and the hundreds section "H1." In addition, inverse outputs are provided for each binary digit by the inclusion of an inverter in each output line. The inverse outputs are shown as "$\overline{U1}$", "$\overline{T1}$", "$\overline{H1}$", etc. The output of divide by 8 circuit 130 is connected to one input of an AND gate 134; the "COUNT" output from relative phase angle logic circuit 24 is connected to the other input of AND gate 134. The output of AND gate 134 is connected to one input of an OR gate 135. The output of OR gate 135 is connected to the input of units counting section 131. OR gate 135 is inserted merely as an added convenience to allow the counter to check the closing time of a source paralleling circuit. A 100 pulse per second test clock circuit may be connected to the other input of gate 135 for this purpose, and switched on and off by the paralleling breaker circuit to provide closing time in hundredths of a second. The "RESET" output from logic circuit 24 is connected to the "reset" input of each counting section. That to the unit section, however, is through an OR gate 136. A second input or OR gate 136 is connected to the output of an AND gate 137, the inputs of which are connected to the output of hundreds section 133 and the "80 to 99" output of tens section 132. With a pulse rate of 22.68 kHz. into the counter, the counter will indicate 180 pulses for 180° phase difference of a 63 Hz. source. With a lower frequency source, however, more pulses would be received with 180° phase difference. For example, with a 60 Hz. source, 189 pulses would be received. AND gate 137 and OR gate 136, connected as shown, hold the counter indication at 180° after 180 pulses have been counted until a reset pulse is received. This eliminates a possible source of confusion to the operator. Counter 27, therefore, counts approximately one count for each degree of phase difference between the two sources. The count starts as soon as the "RESET" pulse from logic circuit 24 disappears and ends when the zero crossing pulse from the second source to cross zero in a positive direction appears, with no count higher than 180 shown. If sources of a higher frequency are to be paralleled, of course, a higher frequency oscillator should be used. A pulse rate of $f \times 360$ into the counter where $f$ is in Hertz gives a reading directly in degrees.

Translator 29 may be an ordinary binary to decimal translator with a section for tens and a section for units. Since complete translation for the whole units decade is not necessary for the synchronizer check application, however, FIG. 9 is included to show one possible abbreviation. In FIG. 9, the regular and inverse outputs from the tens section of counter 27 are combined in a series of nine AND gates to produce exclusive decade degree outputs 0° through 80°. Since 90° is not useful in the synchronizer check it has been eliminated. The logic is simple and well known. For example, "T1"(10)+"T2"(20)+"T4"(40) are combined in AND gate 141 to produce "70°" out. Likewise "T2"+"T4"+"$\overline{T1}$" (not T1) are combined in AND gate 142 to produce "60°." Only three outputs are used for the units section of the translator "3 or 4," "<5" and "≥5" "U1," "U2" and "$\overline{U4}$" are summed in AND gate 143 to provide an output representing 3, and "U4," "$\overline{U2}$" and "$\overline{U1}$" are summed in AND gate 144 to provide an output representing 4. The 3 output of AND gate 143 and the 4 output of AND gate 144 are connected through an OR gate 146 to the translator output "3 or 4." In a similar manner sums representing 5, 6 or 7 and 8 or 9 are connected through an OR gate 147 to output ">5." "<5" output is provided by inverting "≥5"

Figure 10:
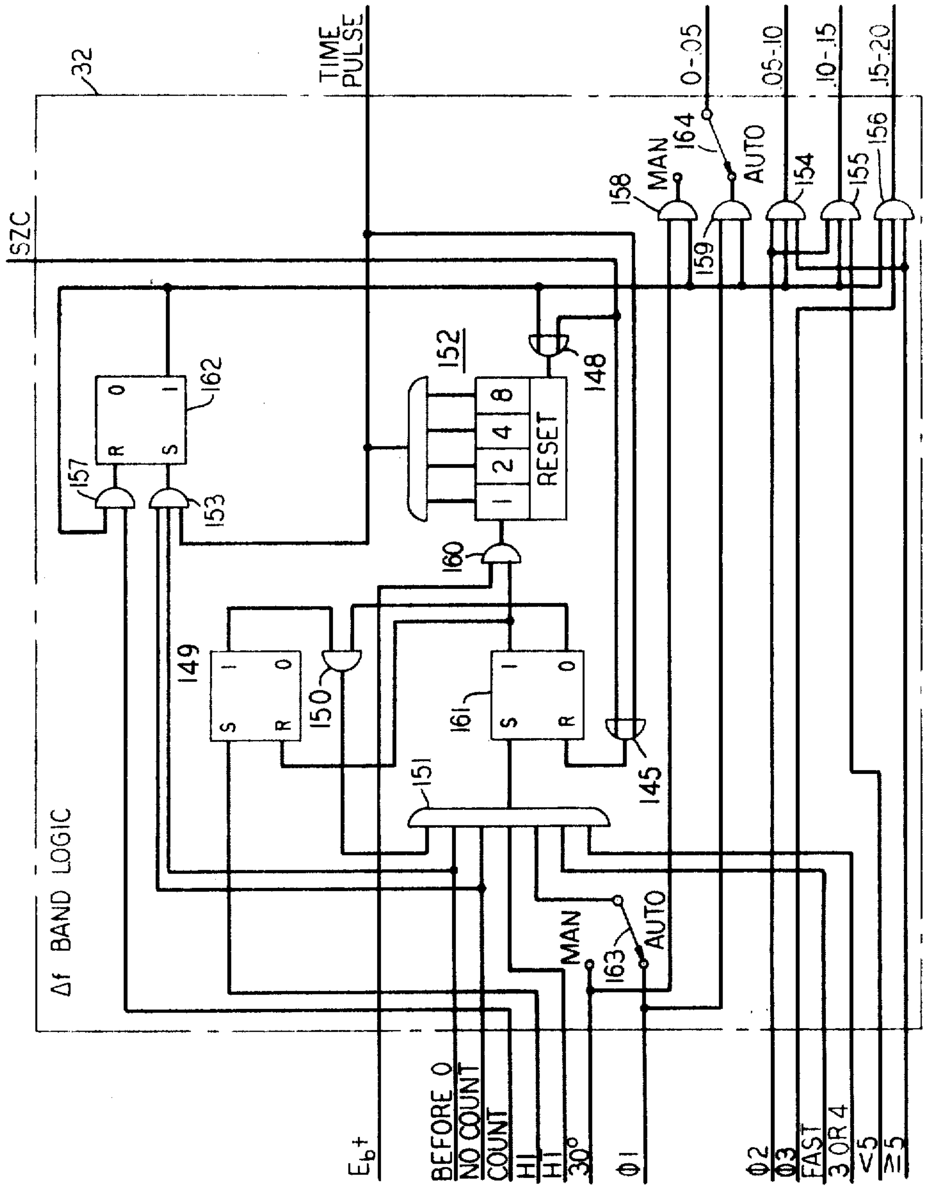
FIG. 10 is a schematic diagram of a $\Delta f$ band logic circuit that may be used in block 32 of the circuit of FIGS. 1 and 2.

A frequency band logic circuit that is suitable for logic circuit 32 is shown in FIG. 10. The circuit of FIG. 10 includes a 7-input AND gate 151, a divide by 16 circuit 152, four 3-input AND gates 153, 154, 155 and 165, five 2-input AND gates 157, 158, 159, 160 and 150, three flip-flops 161, 162 and 149, two OR gates 148 and 145, two switches 163 and 164. Both switches are of the single-pole double-throw variety with one position for manual synchronizing operation and one for automatic. They may be ganged together for convenience. Switch 163 has its two inputs connected to the "30°" output of translator 29 and the " 1" output of junction box 31, respectively, and its output connected to an input of AND gate 151. The other six inputs of AND gate 151 are connected to the following leads: The output of AND gate 150, "BEFORE 0" from relative phase sensor 14, $\overline{H1}$ from counter 27, "NO COUNT" from inverter 25, "FAST " from relative frequency sensor 21, and "3 or 4" from translator 29. "BEFORE 0" and "no count" are also connected to individual inputs of AND gate 153. The output of AND gate 151 is connected to the "set" input of flip-flop 161. The "1" output of flip-flop 161 is connected to one input of AND gate 160 and the "reset" input of flip-flop 149. The other input of AND gate 160 is connected to the "$E_b$+" output from zero crossing detector 11. The output of AND gate 160 is connected to divide by 16 circuit 152, which may be a four-digit binary counter feeding an AND gate. The output of the divide by 16 circuit is connected to the third input of AND gate 153, one input of OR gate 145 and the circuit "TIME PULSE" output. The output of AND gate 153 is connected to the "set" input of flip-flop 162. The "1" output of flip-flop 162 is connected to one input of OR gate 148 and to one input of each of AND gates 154, 155, 156, 158 and 159. The other input of AND gate 157 is connected to the "COUNT" output of relative phase angle logic circuit 24. The output of AND gate 157 is connected to the "reset" input of flip-flop 162. The other input of AND gate 158 is connected to the "30°" output of translator 29; the other input of AND gate 159 is connected to the "Φ1" output of junction box 31. The remaining inputs to AND gate 154 are connected to the "Φ2" output of junction box 31 and the "≥5" output of translator 29, respectively; the remaining two inputs of AND gate 155 are connected to the "Φ2" output of junction box 31 and the "<5" output of translator 29, respectively; and the remaining two inputs of AND gate 156 are connected to the '"Φ3"utput ofjunctionbox31andthe "≥5" output of translator 29, respectively. The outputs of AND gates 158 and 159 are connected to the manual and automatic inputs respectively of switch 164. The output of switch 164 and the outputs of AND gate 154, 155 and 156 are each connected to a separate circuit output representing a 0.05 Hz. band of frequency difference. The "-set" input of flip-flop 149 is connected to the "H1" output of counter 27. The "1" output of flip-flop 149 and the "0" output of flip-flop 161 are connected to the respective inputs of AND gate 150. Finally the "SZC" output from AND gate 13 is connected to the other inputs of OR gates 145 and 148 and the outputs of OR gate 145 and 148 are connected to the "reset" inputs of flip-flop 161 and divide by 16 circuit 152, respectively.

The frequency band logic circuit 32 operates by measuring the phase shift that occurs during approximately one-fourth second interval. In order to terminate at a point where a paralleling signal may be given, the interval starts approximately one-fourth second before the time when the signal should be given for a maximum allowable frequency difference. This is taken care of by connections into AND gate 151. With a fixed circuit closing time, a greater frequency difference requires a greater phase angle lead. A usable range of 0 to 0.2 Hz. frequency difference, that is, from 0° to 72° phase angle shift per second is made possible by providing four separate frequency bands, each 0.05 Hz. in width.

AND gate 151 is enabled by a voltage on each of its inputs. Therefore, the sources must be approaching synchronism the oncoming source must be faster than the loaded source and the phase angle counter must not be counting. The phase angle difference at which the timing circuit is started is determined by the position of switch 163. If the switch is in the manual position, gate 151 is enabled when the phase angle difference between the sources is 34°. That is, both the "30°" input and the "3 or 4" input are energized. In addition, the $\overline{H1}$ input must be energized to differentiate from 134°. If the switch is in the automatic position, the decade that is connected to " 1" must be energized. From the table of FIG. 3, with a closing time of 0.5 second " 1" would be connected to "60°" from translator 29. Therefore, AND gate 151 would be enabled at a phase angle difference of 64°. Enabling of AND gate 151 sets flip-flop 161 to allow AND gate 160 to pass the "$E_b$+" pulses from zero crossing detector 11. Divide by 16 circuit 152 provides one output pulse after 16 input pulses. With a source frequency of 63 Hz. this is an interval of 16/63 or approximately one-fourth second. At the end of that period, if there is still a signal voltage on the "BEFORE 0" and "NO COUNT" inputs AND gate 153 is enabled to set flip-flop 162.

This resets divide by 16 circuit 152 through OR gate 148 and raises one input to each of the output AND gates 154, 155, 156, 158 and 159. If at this time the phase has shifted beyond the 0 point, the signal on the "BEFORE 0" lead will disappear and AND gate 153 will not be enabled. Flip-flop 162 having been set, one output AND gate will be enabled depending upon the frequency difference of the two sources, provided the frequency difference is $\leq 0.2$Hz. For example, using the 0.5 second closing time wiring in junction box 31 as shown by the table of FIG. 3, " 1" will be connected to "60°," " 2" to "50°" and " 3" to "40°." AND gate 151 will be enabled to start the one-fourth second interval in the automatic mode when the phase angle difference is 63° or 64°. At the end of the one-fourth second interval, if the phase angle is 60° or greater, gate 159 will be enabled providing an output on the "0—0.05" lead indicating a maximum phase shift of 4° in one-fourth second, or 0.045 Hz. If the phase at the end of the one-fourth second interval is between 55° and 60°, AND gate 154 will be enabled to indicate between 0.05 and 0.1 Hz. $\Delta f$. Similarly, 50° to 55° will enable AND gate 155, and 45° to 50° will enable AND gate 156. A pulse on one of the four outputs therefore indicates a frequency difference within the indicated range. If the $\Delta f$ is >0.2 Hz., none of the output AND gates will be enabled, and therefore no paralleling signal will be permitted. The appearance of a "COUNT" pulse from logic circuit 24 enables AND gate 151 to reset flip-flop 162 and terminate the output signal.

Flip-flop 49 is included to prevent divide by 16 circuit 152 from recycling in the case of a very low relative frequency. Flip-flop 149 is set when the relative phase angle is 100°, usually in the "AFTER 0" sector of the slip cycle, and remains set until the timing cycle starts. As soon as flip-flop 161 is set to start pulses into divide by 16 circuit 152, flip-flop 149 is reset, disabling AND gates 150 and 151. AND gate 150 is not reenabled until counter 27 again shows a relative phase angle of 100° to set flip-flop 149.

False readings that might otherwise be caused by a whole slip cycle occurring before divide by 16 circuit 152 times out, in the case of a very high relative frequency, are prevented by the resetting of flip-flop 161 and divide by 16 circuit 152 by the "SZC" pulses through OR gates 145 and 148, respectively.

Figure 11:
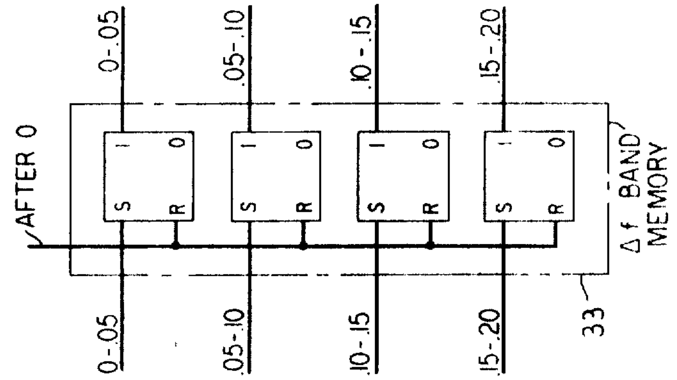
FIG. 11 is a schematic diagram of a $\Delta f$ band memory that may be used in block 33 of the circuit of FIGS. 1 and 2.

The $\Delta f$ band memory circuit 33 shown in FIG. 11 operates to hold the information after the pulses disappear from the output of $\Delta f$ band logic circuit 32. The memory circuit is merely an array of flip-flops, one set by each $\Delta f$ band logic output and all of them reset by an "AFTER 0" signal from relative phase sensor 14.

Figure 12:
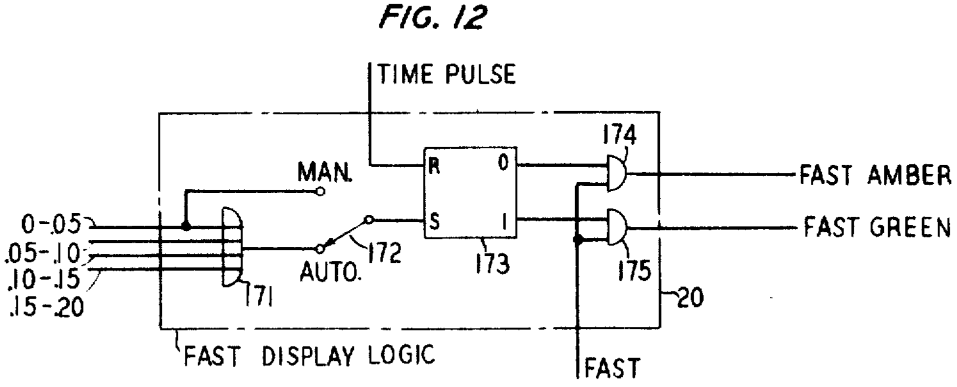
FIG. 12 is a schematic diagram of a "FAST" display logic circuit that may be used in block 20 of the circuit of FIGS. 1 and 2.

A fast display logic circuit 20 is shown in FIG. 12. In this circuit each of the outputs of $\Delta f$ band memory 33 is fed through an OR gate 171 and the "automatic" terminal of a single-pole double-throw switch 172 to the "set" input of a flip-flop 173. The "TIME PULSE" output of $\Delta f$ band logic circuit 32 is fed into the "reset" input of flip-flop 173. The "0" output of flip-flop 173 is connected to one input of an AND gate 174 and the "1" output of flip-flop 173 is fed into one input of AND gate 175. The "FAST" output from relative frequency sensor 21 is connected to the other inputs of AND gates 174 and 175, and the outputs of AND gates 174 and 175 drive the "FAST GREEN" and "FAST AMBER" displays, respectively. The manual terminal of switch 172 is connected to the "0 to 0.05" output of $\Delta f$ band memory 33. When the one-fourth second timing circuit of FIG. 10 times out, the pulse on the "TIME PULSE" lead resets flip-flop 173. If the frequency difference is within the 0 to 0.2 Hz. range, a signal voltage on one of the inputs to OR gate 171 will immediately set flip-flop 173 to provide a "FAST GREEN" output. On the other hand, if the frequency difference was greater than 0.2, no signal will appear to set flip-flop 173, and it will remain reset to drive the "-FAST AMBER" output.

Figure 13:
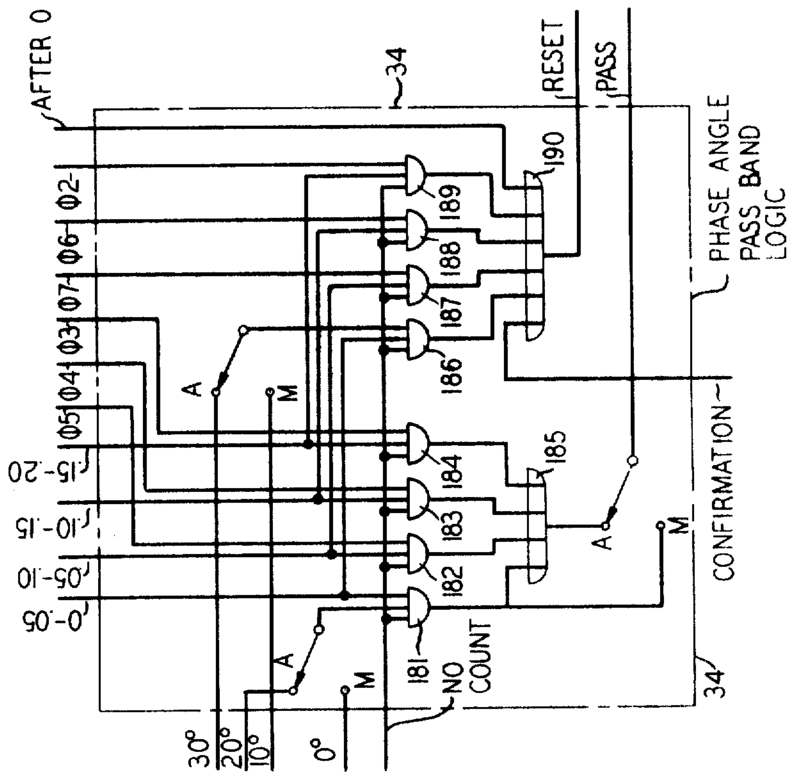
FIG. 13 is a schematic diagram of a phase angle passband logic circuit that may be used in block 34 of the circuit of FIGS. 1 and 2.

A phase angle passband logic circuit that is suitable for circuit 34 is shown in FIG. 13. The circuit of FIG. 13 is made up of two sets of AND gates 181—184 and 186—189, each set feeding an OR gate 185 and 190, respectively. Three single-pole double-throw switches are also included for converting between manual and automatic synchronizing operation. The switches may be ganged with all of the other automatic-manual switches for convenience. A description of this circuit operation will make the connections obvious. The first set of AND gates 181, 182, 183 and 184 operate to combine the $\Delta$ frequency band information with the proper phase angle information to provide a "PASS" output signal during the period that a paralleling signal can be given to effect a safe and smooth paralleling connection. The greater the frequency difference the greater is the phase angle at which the signal must be given. Each of the first set of AND gates, therefore, has one input connected to an individual one of the $\Delta f$ band memory outputs and one input connected to an individual decade output of the translator, the higher frequency difference being joined with the higher phase angle difference. Except for the lowest band, the phase angle information is adjusted for circuit closing time by junction box 31 before entering circuit 34. A third input to each AND gate is the "NO COUNT" output from inverter 25. This disables each gate until the phase angle count is made. In the automatic operating mode, therefore, a "PASS" signal is delivered if the frequency difference is between 0.15 and 0.02 Hz., and the circuit closing time is 0.5 seconds ("Φ3" connected to "40°") when the phase angle between the sources is between 40 and 49°. If the frequency difference is between 0 and 0.05 Hz. ("Φ5" is connected to "20°" in junction box 31), the "set" signal is delivered when the phase angle is between 20°" and 29°. In the manual mode, the maximum frequency difference allowed is 0.05 Hz., and the phase angle passband is 0° to 9°.

The second set of AND gates 186, 187, 188 and 189 and OR gate 190 operate to remove the "PASS" signal in case the oncoming source "backs up." That is, in the case of very low $\Delta f$, where the oncoming source was fast when the pass signal was given, but then slowed down and became slower than the bus *before* 0° was reached. In this case, the relative "phase angle begins to increase without going through zero," hence the use of the term "backs up." In each case a "RESET" output is given if the phase angle "backs" into the next decade. With a 0.15 to 0.20 Hz. frequency difference and a closing time of 0.5 second, therefore, a phase difference of between 50° and 59° will enable AND gate 189 and produce a "RESET" output. Likewise with 0 to 0.05 Hz. frequency difference in the automatic mode, 30° to 39° will produce a "RESET" and in the manual mode 10° to 19°. An "AFTER 0" indication from the relative phase sensor 14 or a confirmation signal indicating that a paralleling has been completed will also produce a "RESET" output.

Figure 14:
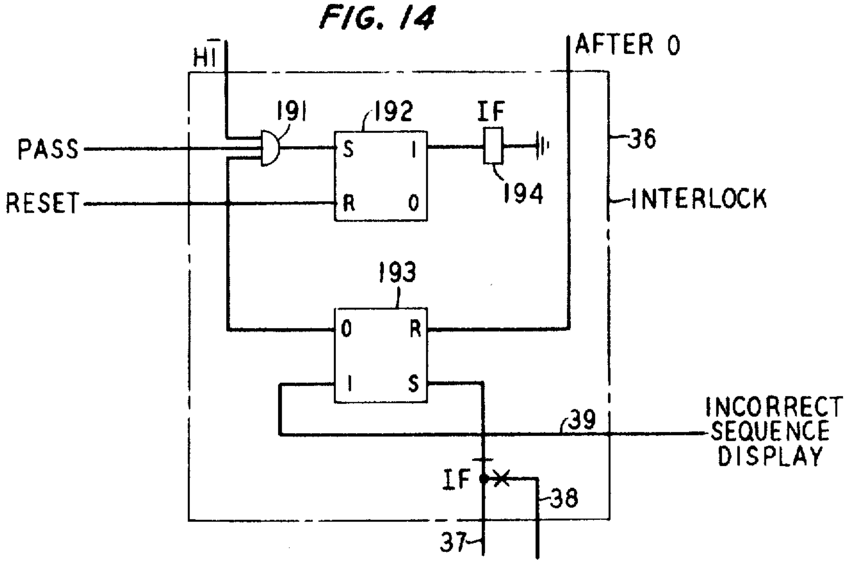
FIG. 14 is a schematic diagram of an interlock circuit that may be used in block 36 of the circuit of FIGS. 1 and 2.

FIG. 14 shows a simple interlock circuit that can provide the function of interlock 36 to allow or prevent the paralleling connection between the sources. The interlock circuit includes an AND gate 191, two flip-flops 192 and 193, and a single-pole double-throw relay "IF." The "RESET" output from logic circuit 34 is connected to the "reset" input of flip-flop 192. The "PASS" output from logic circuit 34 is connected to one input of AND gate 191; the "0" output of flip-flop 193 is connected to another input of AND gate 191; and the "$\overline{\text{HI}}$" output of counter 27 is connected to the third AND gate 191 input. The output of AND gate 191 is connected to the "set" input of flip-flop 192 and the "1" output of flip-flop 192 is connected through the coil 194 of interface relay "IF" to ground. The "reset" input of flip-flop 193 is connected to the "AFTER 0" output of relative phase sensor 14, and the 1 output of flip-flop 193 is connected to interlock circuit output "INCORRECT SEQUENCE." Battery voltage from line 37 is connected to the "set" input of flip-flop 193 through the break contacts of relay "IF" and to the paralleling breaker operating coil 46 through the make contacts of relay "IF" over line 38.

Assuming both flip-flops are reset initially, a "PASS" signal from logic circuit 34 will set flip-flop 192 to energize relay coil 194, provided the relative phase angle is under 100°. The energized relay will disconnect line 37 from flip-flop 193 and connect line 37 to line 38. A subsequent attempt at paralleling the circuits by energizing line 37 will energize line 38 and operate the paralleling circuit breaker. A "RESET" signal from logic circuit 34 prevents relay coil 194 from being energized. As a consequence, an attempt at paralleling by energizing line 37 with relay coil 194 deenergized sets flip-flop 193 to provide an "INCORRECT SEQUENCE" output. Flip-flop 193 then remains set, preventing a paralleling connection for the remainder of the slip cycle until the "AFTER 0" input is again energized.

This feature prevents the harmful practice of initiating a paralleling signal before the synchronizer check passband is entered and allowing the synchronizer check to complete the paralleling as soon as the passband is entered.

Figure 15:
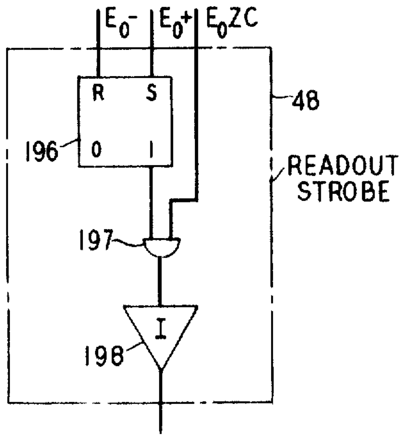
FIG. 15 is a schematic diagram of a readout strobe circuit that may be used in block 48 of the circuit of FIGS. 1 and 2.

Finally, the readout strobe 48 of the synchroscope is shown in FIG. 15. It consists merely of a flip-flop 196 and an AND gate 197. Flip-flop 196 is controlled by the polarity outputs of zero crossing detector 12. It is reset by a "−" output and set by a "+" output. AND gate 197 is enabled by a "1" output of flip-flop 196 and a zero crossing pulse from zero crossing detector 12. The strobe pulse out of readout strobe 48 is therefore produced in response to the negative-going zero crossing of the oncoming source $E_o$. Since counter 27 is reset and counts only between adjacent positive-going zero crossings of the two sources, the count is always steady when the strobe pulse occurs, allowing rapid transfer of the count to decoder driven storage 49 and maximum stability of the digital output display. An inverter 198 may be connected to the output of AND gate 197 if the particular decoder driver storage unit requires a negative strobe pulse. It will be noted that the table of FIG. 3 is worked out for paralleling 60 Hz. sources with breaker closing times up to 0.85 seconds. Junction box connections for other frequencies and closing times can be easily calculated from a consideration of the within described circuits. For example, from FIG. 13 it can be seen that $\varphi 4$ determines the decade of phase angle difference at which a paralleling signal will be allowed if the measured frequency difference is between 0.10 and 0.15 Hz. Likewise, $\underline{\varphi 6}$ determines the decade at which the signal will not be allowed because of "-backup." If the frequency difference is 0.15 Hz., it is equivalent to 0.15×360°=54° per second phase shift. If the paralleling breaker circuit closing time is 0.65 seconds, the theoretical phase angle lead at which a paralleling signal should be given is 0.65×54°=35.1°. In order to provide an operating margin, paralleling check signals should be passed if they occur while the phase difference is within the next higher decade, namely 40°—49°. Hence, $\varphi 4$ is connected to the 40° output of translator 29. $\underline{\varphi 6}$, which provides the backup guard, is connected to the next higher decade, 50°. $\underline{\varphi 5}$ and $\underline{\varphi 3}$ are worked out similarly for frequency differences of 0.1 Hz. and 0.2 Hz., respectively. Since it is not necessary to restrict closing to a smaller angle, however, no decade lower than 20° is used. It will also be noted that for manual operation only a frequency difference of 0.05 Hz. and a phase angle difference of 0° to 10° are allowed.

The $\underline{\varphi 1}$, $\underline{\varphi 2}$, and $\underline{\varphi 3}$ connections are used in the frequency measuring circuit 32, FIG. 10 divide by 16 counter 152 is started when the relative phase angle is the value of $\varphi 1$+3 or 4°. This count must begin at an early enough time to allow a closing at the highest allowable frequency difference of 0.2 Hz. A breaker closing time of 0.85 seconds, with the theoretical phase angle lead is 0.2×360°×0.85=61.2°. The frequency difference measurement takes approximately one-fourth second (16 cycles of input frequency), which corresponds to a maximum change of phase angle of 18° when the $\Delta f$ is the maximum allowable 0.2 Hz. (0.2×360°×¼=18°Thus, the count must begin when the relative phase angle is more than 79.2°, and 83° or 84° is used; $\varphi 1$ is connected to 80°. With the count starting at 84° it is easy to determine what angle at the end of one-fourth second corresponds to the wanted bands of frequency difference. Hence, a frequency difference of 0.1 Hz. will provide a phase difference of 0.1×360×¼=9°, or a phase measurement at the end of the timing period of 84—9=75°, and $\underline{\varphi 2}$ is connected to the 70° decade. $\underline{A \geq 5}$ output is also required through gate 154 for the 0.1 Hz. measurement. The other values of table III are calculated in like manner.

According to the principles of the invention, therefore, maximum protection can be afforded in paralleling two AC power sources. A passband of the minimum practical width is provided, based on the combination of relative frequency and the paralleling circuit closing time. In addition, paralleling may not be allowed unless the oncoming source is of slightly higher frequency and approaching in-phase synchronism. The invention further permits recognition of the fact that satisfactory manual paralleling must be confined to a more restricted range of frequency and phase difference and actually forces such restricted range to exist for manual paralleling. With the addition of a few simple circuits and readouts, a digital synchroscope is produced that utilizes the same logic and that can be used simultaneously with the synchronizer check circuit. All of the circuits use simple logic gates that are readily producible in integrated circuit form. For this reason, both the synchronizer check and the synchroscope can be relatively inexpensive and use very little power.

It will be obvious to those skilled in logic circuit design that variations in circuitry other than those described herein can be substituted to perform some of the basic logic functions which cooperate to form the invention. For instance, it is well known that NOR gates may be substituted for AND gates with some minor logic changes. Such changes, of course, do not depart from the spirit and scope of this invention.

What I claim is:

1. A digital synchronizer check circuit for preventing interconnection of a first and a second alternating current source except during periods of safe frequency and phase relationship comprising a first zero crossing detector connected to said first AC source for indicating each zero crossing and the polarity of said first AC source voltage, a second zero crossing detector connected to said second AC source for indicating each zero crossing and the polarity of said second AC source voltage, relative phase indicating means connected to said first and second zero crossing detectors for indicating the relative phase angle between said sources in response to the zero crossing and polarity indications of said zero crossing detectors, relative frequency indicating means connected to said relative phase measuring means for indicating the relative frequency of said first and second sources in response to the relative phase magnitude indication of said relative phase indicating means, synchronism anticipating logic means connected to said relative phase indicating means and said relative frequency indicating means for emitting a "PASS" signal in response to predetermined combinations of frequency and phase indications that anticipate synchronism by a predetermined time period, and interlock means connected to said first and second sources and said synchronism anticipating means for preventing parallel interconnection of said sources except in the presence of said "PASS" signal.

2. A digital synchronizer check circuit as in claim 1 including breaker circuit closing time adjustment means for changing said predetermined time period.

3. A digital synchronizer check circuit as in claim 1 wherein said relative frequency indicating means comprises timing means for indicating a predetermined time period, first gating means connected to said relative phase indicating means and said timing means for starting said predetermined time period in response to a first predetermined relative phase indication and second gating means connected to said relative phase indicating means and said timing means for passing a second predetermined relative phase indication at the end of said predetermined time period whereby said passed second relative phase indication at the end of said predetermined time period also indicates the relative frequency of said sources.

4. A digital synchronizer check circuit as in claim 3 wherein said timing means comprises a counter for counting a predetermined number of cycles of one of said sources.

5. A digital synchronizer check circuit as in claim 3 wherein said relative frequency indicating means includes a plurality of outputs for indicating a plurality of relative frequencies.

6. A digital synchronizer check circuit as in claim 1 including a simultaneous zero crossing detector connected to said first and second zero crossing detectors for indicating simultaneous zero crossings of the voltages of said first and second sources, relative phase sensing means connected to said zero crossing detectors, said simultaneous zero crossing detector and said synchronism anticipating logic means for indicating an approaching in-phase condition in response to a predetermined sequence of said zero crossing and polarity indications of said zero crossing detectors and simultaneous zero crossing indications from said simultaneous zero crossing detector, and relative frequency sensing means connected to said zero crossing detectors, said simultaneous zero crossing detector and said relative frequency indicating means for indicating the sign of the relative frequency between said sources in response to zero crossing and simultaneous zero crossing indications from said zero crossing and simultaneous zero crossing detectors, respectively, wherein said synchronism anticipating logic means limit said "PASS" signal only when said relative phase sensing means indicates an approaching in-phase condition and said relative frequency sensing means indicates that said second source is of higher frequency than said first source.

7. A digital synchronizer check circuit as in claim 6 including first display means connected to said relative frequency sensing means for visually displaying the sign of the relative frequency between said sources, and second display means connected to said relative phase indicating means for visually displaying the magnitude of said relative phase indication, thereby adding the function of synchroscope to the synchronizer check circuit.

8. A digital synchroscope for visually indicating the sing and magnitude of the relative phase angle between two AC sources comprising an individual zero crossing detector connected to each of said sources for indicating the polarity and the zero crossings of said respective AC sources, a simultaneous zero crossing detector connected to said zero crossing detectors for indicating simultaneous zero crossings of said sources, a relative frequency sensing means connected to said zero crossing detectors and said simultaneous zero crossing detectors for indicating the sign of said relative frequency in response to the zero crossing indications and the simultaneous zero crossing indications from said zero crossing detectors and said simultaneous zero crossing detector, respectively, first display means connected to said relative frequency sensing means for visually displaying the sign of said relative frequency in response to the indication from said relative frequency sensing means, relative phase indicating means connected to said zero crossing detectors and said simultaneous zero crossing detectors for indicating the relative phase angle between said sources in response to said zero crossing pulses, and second display means connected to said relative phase indicating means for visually displaying the magnitude of the indication from said relative phase indicating means.